US012810507B2

(12) United States Patent
Jain et al.

(10) Patent No.: US 12,810,507 B2
(45) Date of Patent: Nov. 24, 2026

(54) METHOD AND SYSTEM FOR PERSONALIZED MULTI-SUBJECT TEXT TO IMAGE GENERATION

(71) Applicant: Tata Consultancy Services Limited, Mumbai (IN)

(72) Inventors: Arushi Jain, Delhi (IN); Shubham Singh Paliwal, Delhi (IN); Monika Sharma, Delhi (IN); Vikram Jamwal, Pune (IN); Lovekesh Vig, Delhi (IN)

(73) Assignee: Tata Consultancy Services Limited, Mumbai (IN)

( * ) Notice: Subject to any disclaimer, the term of this patent is extended or adjusted under 35 U.S.C. 154(b) by 113 days.

(21) Appl. No.: 18/903,256

(22) Filed: Oct. 1, 2024

(65) Prior Publication Data

US 2025/0166134 A1 May 22, 2025

(30) Foreign Application Priority Data

Nov. 20, 2023 (IN) ............................ 202321078790

(51) Int. Cl.
*G06T 5/60* (2024.01)
*G06T 5/50* (2006.01)
(Continued)

(52) U.S. Cl.
CPC ................ *G06T 11/60* (2013.01); *G06T 5/50* (2013.01); *G06T 5/60* (2024.01); *G06T 5/70* (2024.01);
(Continued)

(58) Field of Classification Search
CPC .... G06T 5/60; G06T 5/50; G06T 5/70; G06T 7/11; G06T 7/194; G06T 11/60;
(Continued)

(56) References Cited

U.S. PATENT DOCUMENTS

2023/0081171 A1 3/2023 Zhang et al.
2024/0169623 A1* 5/2024 Zeng ...................... G06T 11/60

FOREIGN PATENT DOCUMENTS

CN 116051668 B 9/2023

OTHER PUBLICATIONS

Bar-Tal, Omer, et al. "Multidiffusion: Fusing diffusion paths for controlled image generation." (2023). (Year: 2023).*

(Continued)

*Primary Examiner* — Alicia M Harrington
*Assistant Examiner* — Hyorim Park
(74) *Attorney, Agent, or Firm* — Finnegan, Henderson, Farabow, Garrett & Dunner, LLP

(57) ABSTRACT

Text-to-image models are used to generate images based on text prompts. Existing text-to-image models create images that are often unclear and exhibit hybrid characteristics of multiple subjects i.e., each subject present in image exhibit characteristic of multiple subjects. Present disclosure provides a method and a system for personalized multi-subject text to image generation. The system first fine-tunes existing text-to-image diffusion model using a plurality of images of target subjects. Then, the system performs image generation based on local text prompts using the fine-tuned text-to-image diffusion model. In particular, the fine-tuned text-to-image diffusion model uses a composite diffusion algorithm for generating subject images. Thereafter, the system model computes a subject aware segmentation loss for generated images which is then used to correct the subject appearance in the generated images. Finally, the system applies a global diffuser to the generated images to create a harmonized image based on a global text prompt.

15 Claims, 7 Drawing Sheets

(51) Int. Cl.
*G06T 5/70* (2024.01)
*G06T 7/11* (2017.01)
*G06T 7/194* (2017.01)
*G06T 11/60* (2026.01)
*G06V 10/764* (2022.01)
*G06V 10/776* (2022.01)

(52) U.S. Cl.
CPC ................ *G06T 7/11* (2017.01); *G06T 7/194* (2017.01); *G06V 10/764* (2022.01); *G06V 10/776* (2022.01); *G06T 2207/10024* (2013.01); *G06T 2207/20081* (2013.01); *G06T 2207/20084* (2013.01); *G06T 2207/20221* (2013.01)

(58) Field of Classification Search
CPC . G06T 2207/10024; G06T 2207/20081; G06T 2207/20084; G06T 2207/20221; G06V 10/764; G06V 10/776
See application file for complete search history.

(56) References Cited

OTHER PUBLICATIONS

Ruiz, Nataniel, et al. "Dreambooth: Fine tuning text-to-image diffusion models for subject-driven generation." Proceedings of the IEEE/CVF conference on computer vision and pattern recognition. 2023. (Year: 2023).*

Author: Vikram Jamwal, Ramaneswaran S. Title: Composite Diffusion Date: 2023 Link: http://arxiv.org/pdf/2307.13720.

* cited by examiner

METHOD AND SYSTEM FOR PERSONALIZED MULTI-SUBJECT TEXT TO IMAGE GENERATION

PRIORITY CLAIM

This U.S. patent application claims priority under 35 U.S.C. § 119 to: Indian patent application Ser. No. 20/232,1078790, filed on Nov. 20, 2023. The entire contents of the aforementioned application are incorporated herein by reference.

TECHNICAL FIELD

The disclosure herein generally relates to text to image generation, and, more particularly, to a method and a system for personalized multi-subject text to image generation.

BACKGROUND

Text-to-image models are generally used to generate images based on text prompts. In particular, the text-to-image models first take a natural language description (also referred as text prompt) as input and then effortlessly converts the text prompts into visual renderings matching the natural language description. Nowadays, the text-to-image models are being used in various applications across various industries, such as advertising, marketing, entertainment, creative content creation like story visualization.

Currently, many text-to-image models like Textual Inversion and Dreambooth are available for performing text to image conversion. However, in cases where more than one personalized subject needs to be present in the image generated based on text, the images are often unclear and exhibit hybrid characteristics of multiple subjects i.e., each subject present in the image exhibit characteristic of multiple subjects. Thus, making them non-usable for specific applications.

Recently, efforts have been made to address the limitation of more than one personalized subject, with models like Custom-Diffusion and Subject-Diffusion that allow generation of images with multiple personalized subjects. However, these models still struggle to generate complex compositions with more than two customized subject.

SUMMARY

Embodiments of the present disclosure present technological improvements as solutions to one or more of the above-mentioned technical problems recognized by the inventors in conventional systems. For example, in one aspect, there is provided a method for personalized multi-subject text to image generation. The method comprises receiving, by a system via one or more hardware processors, a plurality of inputs associated with text-to-image generation from a user device, wherein the plurality of inputs comprises a) a plurality of personalized images of each subject of one or more subjects that a user wants to be present in a text converted image, b) one or more local text prompts, c) a global text prompt, and d) a subject segment image, wherein the plurality of personalized images present each subject from different angles and positions, wherein the subject segment image is a colorful map showing desired subject placement of each subject of the one or more subjects in the image to be generated with a color label, wherein each local text prompt of the one or more local text prompts is associated with a subject of the one or more subjects, and wherein the global text prompt is associated with the text converted image to be generated; assigning, by the system via the one or more hardware processors, a unique identifier and a class name to each subject of the one or more subjects; fine-tuning, by the system via the one or more hardware processors, a text-to-image diffusion model based, at least in part, on the plurality of personalized images, the unique identifier and the class name of each subject to obtain a fine-tuned text-to-image diffusion model; creating, by the system via the one or more hardware processors, a noisy image, wherein the noisy image is a normal distribution; iteratively performing: applying, by the system via the one or more hardware processors, composite diffusion on the noisy image based on the one or more local text prompts using the fine-tuned text-to-image diffusion model and a trained segmentation model to obtain a plurality of subject images, wherein the plurality of subject images are associated with the one or more subjects and a background; merging, by the system via the one or more hardware processors, the plurality of subject images to obtain a temporary image; generating, by the system via the one or more hardware processors, a harmonized image based on the temporary image and the global text prompt using the fine-tuned text-to-image diffusion model; and updating, by the system via the one or more hardware processors, the harmonized image as the noisy image, until the harmonized image accurately captures an overall context of the global text prompt; and identifying, by the system via the one or more hardware processors, the harmonized image as the text converted image.

In an embodiment, the method comprises: displaying, by the system via the one or more hardware processors, the text converted image on the user device.

In an embodiment, the step of applying, by the system via the one or more hardware processors, the composite diffusion on the noisy image based on the one or more local text prompts using the fine-tuned text-to-image diffusion model and the trained segmentation model to obtain the plurality of subject images comprises: creating a local image for each subject based on the color label of a corresponding subject, and the local image for the background based on the subject segment image, wherein the color label of each subject is accessed from the subject segment image, and wherein the local image for the background is created based on a white region present in the subject segment image; creating a complementary image for each subject and the background based on the local image of the corresponding subject and the background, respectively; and creating a subject image for each subject based, at least in part, on the local image and the complementary image of the corresponding subject, a local text prompt associated with the corresponding subject, and a subject image for background based on the local image and the complementary image of the background using the fine-tuned text-to-image diffusion model.

In an embodiment, the fine-tuned text-to-image diffusion model creates the subject image for each subject by: using, by the system via the one or more hardware processors, the trained segmentation model to correct subject appearance in the corresponding subject image to obtain a corrected subject image, wherein the trained segmentation model computes subject aware segmentation loss which helps the fine-tuned text-to-image diffusion model to correct the subject appearance in the subject image to obtain the corrected subject image.

In an embodiment, the step of merging, by the system via the one or more hardware processors, the plurality of subject images to obtain the temporary image comprises: merging, by the system via the one or more hardware processors, a plurality of corrected subject images to obtain the temporary image.

In an embodiment, the text-to-image diffusion model is a Dreambooth model.

In another aspect, there is provided a system for personalized multi-subject text to image generation. The system comprises a memory storing instructions; one or more communication interfaces; and one or more hardware processors coupled to the memory via the one or more communication interfaces, wherein the one or more hardware processors are configured by the instructions to: receive a plurality of inputs associated with text-to-image generation from a user device, wherein the plurality of inputs comprises a) a plurality of personalized images of each subject of one or more subjects that a user wants to be present in a text converted image, b) one or more local text prompts, c) a global text prompt, and d) a subject segment image, wherein the plurality of personalized images present each subject from different angles and positions, wherein the subject segment image is a colorful map showing desired subject placement of each subject of the one or more subjects in the image to be generated with a color label, wherein each local text prompt of the one or more local text prompts is associated with a subject of the one or more subjects, and wherein the global text prompt is associated with the text converted image to be generated; assign a unique identifier and a class name to each subject of the one or more subjects; fine-tune a text-to-image diffusion model based, at least in part, on the plurality of personalized images, the unique identifier and the class name of each subject to obtain a fine-tuned text-to-image diffusion model; create a noisy image, wherein the noisy image is a normal distribution; iteratively perform: apply composite diffusion on the noisy image based on the one or more local text prompts using the fine-tuned text-to-image diffusion model and a trained segmentation model to obtain a plurality of subject images, wherein the plurality of subject images are associated with the one or more subjects and a background; merge the plurality of subject images to obtain a temporary image; generate a harmonized image based on the temporary image and the global text prompt using the fine-tuned text-to-image diffusion model; and update the harmonized image as the noisy image, until the harmonized image accurately captures an overall context of the global text prompt; and identify the harmonized image as the text converted image.

In yet another aspect, there are provided one or more non-transitory machine-readable information storage mediums comprising one or more instructions which when executed by one or more hardware processors perform personalized multi-subject text to image generation by receiving, by a system, a plurality of inputs associated with text-to-image generation from a user device, wherein the plurality of inputs comprises a) a plurality of personalized images of each subject of one or more subjects that a user wants to be present in a text converted image, b) one or more local text prompts, c) a global text prompt, and d) a subject segment image, wherein the plurality of personalized images present each subject from different angles and positions, wherein the subject segment image is a colorful map showing desired subject placement of each subject of the one or more subjects in the image to be generated with a color label, wherein each local text prompt of the one or more local text prompts is associated with a subject of the one or more subjects, and wherein the global text prompt is associated with the text converted image to be generated; assigning, by the system, a unique identifier and a class name to each subject of the one or more subjects; fine-tuning, by the system, a text-to-image diffusion model based, at least in part, on the plurality of personalized images, the unique identifier and the class name of each subject to obtain a fine-tuned text-to-image diffusion model; creating, by the system, a noisy image, wherein the noisy image is a normal distribution; iteratively performing: applying, by the system, composite diffusion on the noisy image based on the one or more local text prompts using the fine-tuned text-to-image diffusion model and a trained segmentation model to obtain a plurality of subject images, wherein the plurality of subject images are associated with the one or more subjects and a background; merging, by the system, the plurality of subject images to obtain a temporary image; generating, by the system, a harmonized image based on the temporary image and the global text prompt using the fine-tuned text-to-image diffusion model; and updating, by the system, the harmonized image as the noisy image, until the harmonized image accurately captures an overall context of the global text prompt; and identifying, by the system, the harmonized image as the text converted image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
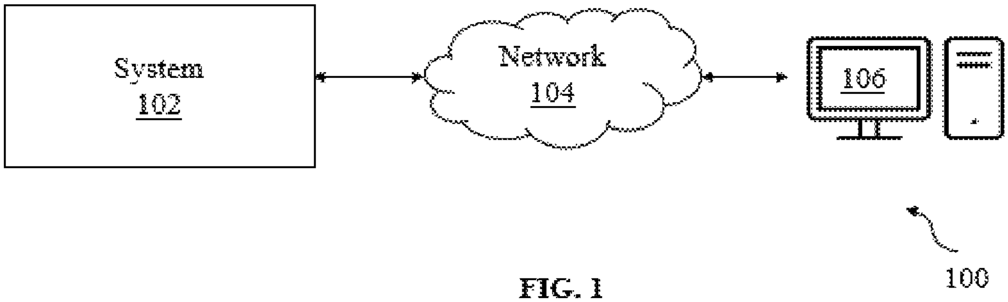
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As discussed earlier, personalized text-to-image models find applications in creative content, custom design, marketing, and also in providing customized visual assets. However, conventional text-to-image models encounter significant challenges when tasked with producing images featuring multiple personalized subjects, such as humans, pets, and objects. These models often generate perplexing images that blend or distort subjects, and thus fail to capture the coherent subject interactions.

So, a text-to-image generation technique that can generate clear images of multiple personalized subjects is still to be explored.

Embodiments of the present disclosure overcome the above-mentioned disadvantages by providing a method and a system for personalized multi-subject text to image generation. The system of the present disclosure first fine-tunes an existing text-to-image diffusion model using a plurality of images of target subjects. Then, the system performs image generation based on local text prompts using the fine-tuned text-to-image diffusion model. In particular, the fine-tuned text-to-image diffusion model uses a composite diffusion algorithm for generating subject images. Thereafter, the system model computes a subject aware segmentation loss for generated images which is then used to correct the subject appearance in the generated images. Finally, the system applies a global diffuser to the generated images to create a harmonized image based on a global text prompt.

In the present disclosure, the system and the method uses the composite diffusion technique in which local diffusers and a trained segmentation model is used to generate images, thereby ensuring correct subject placement in the generated images. Then, the system computes subject aware segmentation loss to correct the subject appearance in the generated images, which further ensures precise subject appearance in the generated image i.e., the characters in the generated image looks more like original subjects. Further, the system uses a global diffuser to generate the harmonized image, thus ensuring right number of subjects are present in the harmonized image while reducing the overall time taken to generate the harmonized image.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, performing loop optimization of a program, performing a K-path interval analysis, abstracting environmental conditions present in the program, etc. The environment 100 generally includes a system 102, an electronic device 106 (hereinafter also referred as a user device 106), each coupled to, and in communication with (and/or with access to) a network 104. It should be noted that one user device is shown for the sake of explanation; there can be more number of user devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The user device 106 is associated with a user (e.g., a content creator/advertisement creator) who is responsible for generating personalized images, for story narration, content creation, advertisement and the like. Examples of the user device 106 include, but are not limited to, a personal computer (PC), a mobile phone, a tablet device, a Personal Digital Assistant (PDA), a server, a voice activated assistant, a smartphone, and a laptop.

The system 102 includes one or more hardware processors and a memory. The system 102 is first configured to receive a plurality of inputs associated with text-to-image generation via the network 104 from the user device 106. The plurality of inputs includes a) a plurality of personalized images of each subject of one or more subjects that a user wants to be present in a text converted image, b) one or more local text prompts, c) a global text prompt, and d) a subject segment image.

Then, the system 102 fine-tunes a text-to-image diffusion model based on the plurality of personalized images, a unique identifier and a class name of each subject to obtain a fine-tuned text-to-image diffusion model. It should be noted that the unique identifier and the class name is assigned to each subject before fine-tuning. In an embodiment, without limiting the scope of the invention, the text-to-image diffusion model is a Dreambooth model.

Once the fine-tuned text-to-image diffusion model is available, the system 102 applies composite diffusion on a noisy image based on the one or more local text prompts using the fine-tuned text-to-image diffusion model and a trained segmentation model to obtain a plurality of subject images. It should be noted that the trained segmentation model is obtained by training a segmentation model with a dataset of the plurality of personalized images of personalized subjects that are used to finetune the text-to-image diffusion model. In an embodiment, without limiting the scope of the invention, the segmentation model is a U-Net segmentation model.

Thereafter, the system 102 applies a subject aware segmentation loss (SAL) to each subject using local diffusers to obtain the corrected subject images which are then merged to obtain a temporary image. Finally, the system 102 generates a harmonized image based on the temporary image and the global text prompt using the fine-tuned text-to-image diffusion model.

The process of personalized multi-subject text to image generation is explained in detail with reference to FIGS. 4A and 4B.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG.

1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
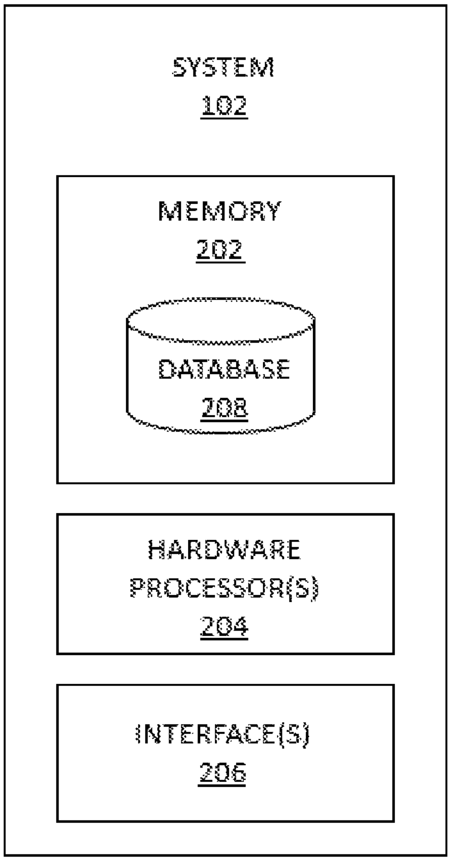
FIG. 2 illustrates an exemplary block diagram of a system for personalized multi-subject text to image generation, in accordance with an embodiment of the present disclosure.

FIG. 2 illustrates an exemplary block diagram of the system 102 for personalized multi-subject text to image generation, in accordance with an embodiment of the present disclosure. In some embodiments, the system 102 is embodied as a cloud-based and/or SaaS-based (software as a service) architecture. In some embodiments, the system 102 may be implemented in a server system. In some embodiments, the system 102 may be implemented in a variety of computing systems, such as laptop computers, notebooks, hand-held devices, workstations, mainframe computers, and the like.

In an embodiment, the system 102 includes one or more processors 204, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 102 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 208 can be stored in the memory 202, wherein the database 208 may comprise, but are not limited to, a composite diffusion algorithm, a text-to-image diffusion model, a trained segmentation model, one or more processes and the like. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

It is noted that the system 102 as illustrated and hereinafter described is merely illustrative of an apparatus that could benefit from embodiments of the present disclosure and, therefore, should not be taken to limit the scope of the present disclosure. It is noted that the system 102 may include fewer or more components than those depicted in FIG. 2.

Figure 3:
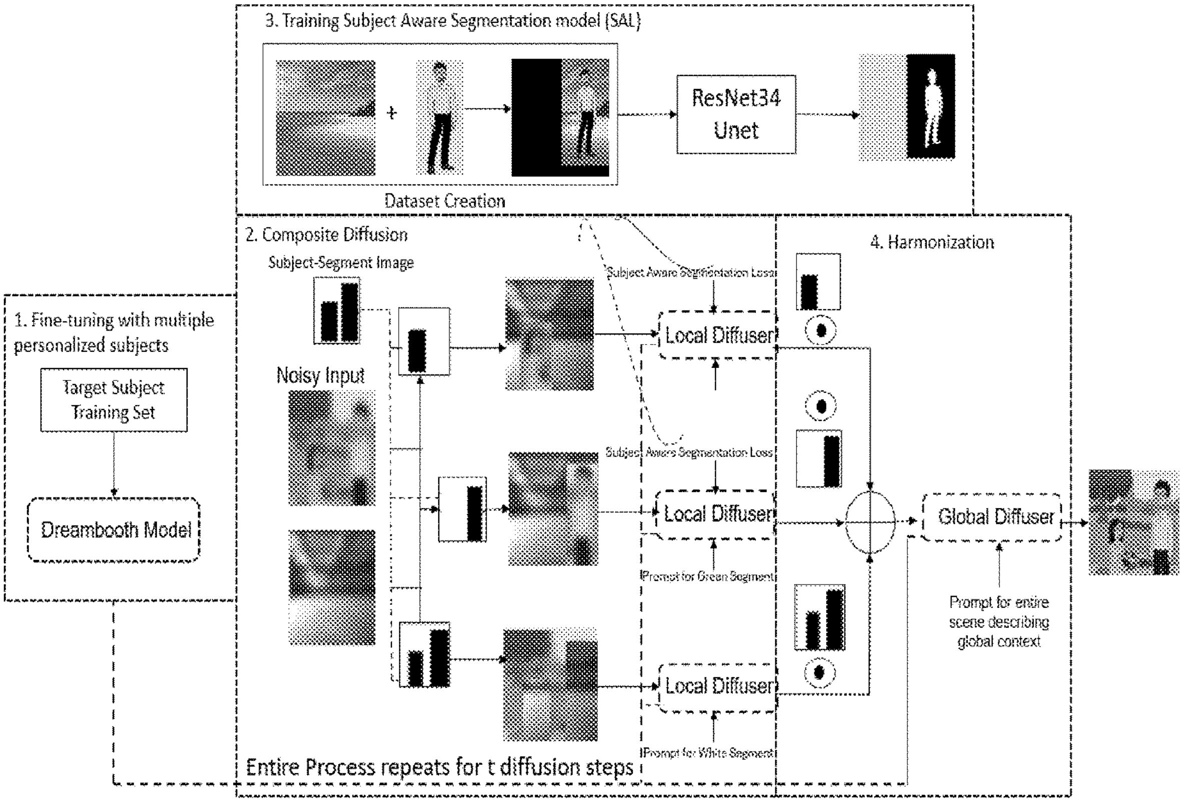
FIG. 3 illustrates a schematic representation of a diffusion process performed by the system of FIG. 2 for personalized multi-subject text to image generation, in accordance with an embodiment of the present disclosure.

FIG. 3 illustrates a schematic representation of a diffusion process performed by the system 102 for personalized multi-subject text to image generation, in accordance with an embodiment of the present disclosure.

As seen in FIG. 3, the system 102 first receives a target subject training set which includes a plurality of personalized images of each subject of one or more subjects that a user wants to be present in a text converted image. The system 102 then fine-tunes a text-to-image diffusion model i.e., a Dreambooth model using the target subject training set to obtain the fine-tuned Dreambooth model. Thereafter, the system 102 performs composite diffusion on noisy input using local diffusers, local text prompts and a subject segment image to obtain a plurality of subject images.

In an embodiment, the system 102 trains a subject aware segmentation model (also referred as segmentation model) using the target subject training set that is used to train the text-to-image diffusion model to obtain a trained subject aware segmentation model. In an embodiment, the subject aware segmentation model is ResNet-34 based U-Net segmentation model.

The system 102 then computes a subject aware segmentation loss for each subject image using the trained subject aware segmentation model which is then used to correct the subject appearance in corresponding subject image.

Further, the system 102 merges the plurality of subject images to obtain a temporary image. Finally, the system 102 generates a harmonized image based on the temporary image and a global text prompt using a global diffuser. It should be noted that the local diffusers and the global diffuser used by the system 102 is the fine-tuned text-to-image diffusion model.

Figure 4A:
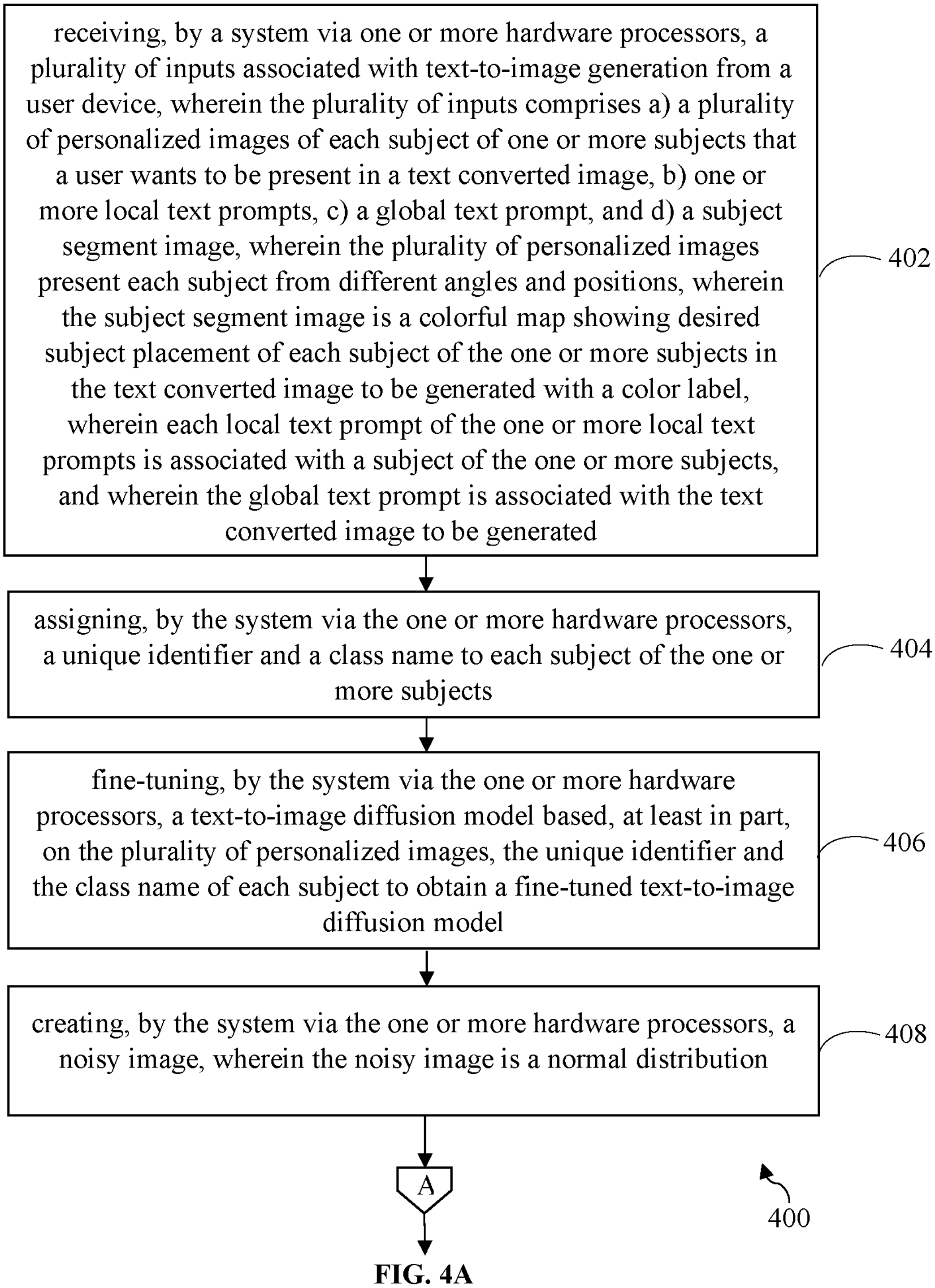
FIGS. 4A and 4B, collectively, illustrate an exemplary flow diagram of a method for personalized multi-subject text to image generation, in accordance with an embodiment of the present disclosure.
Figure 4B:
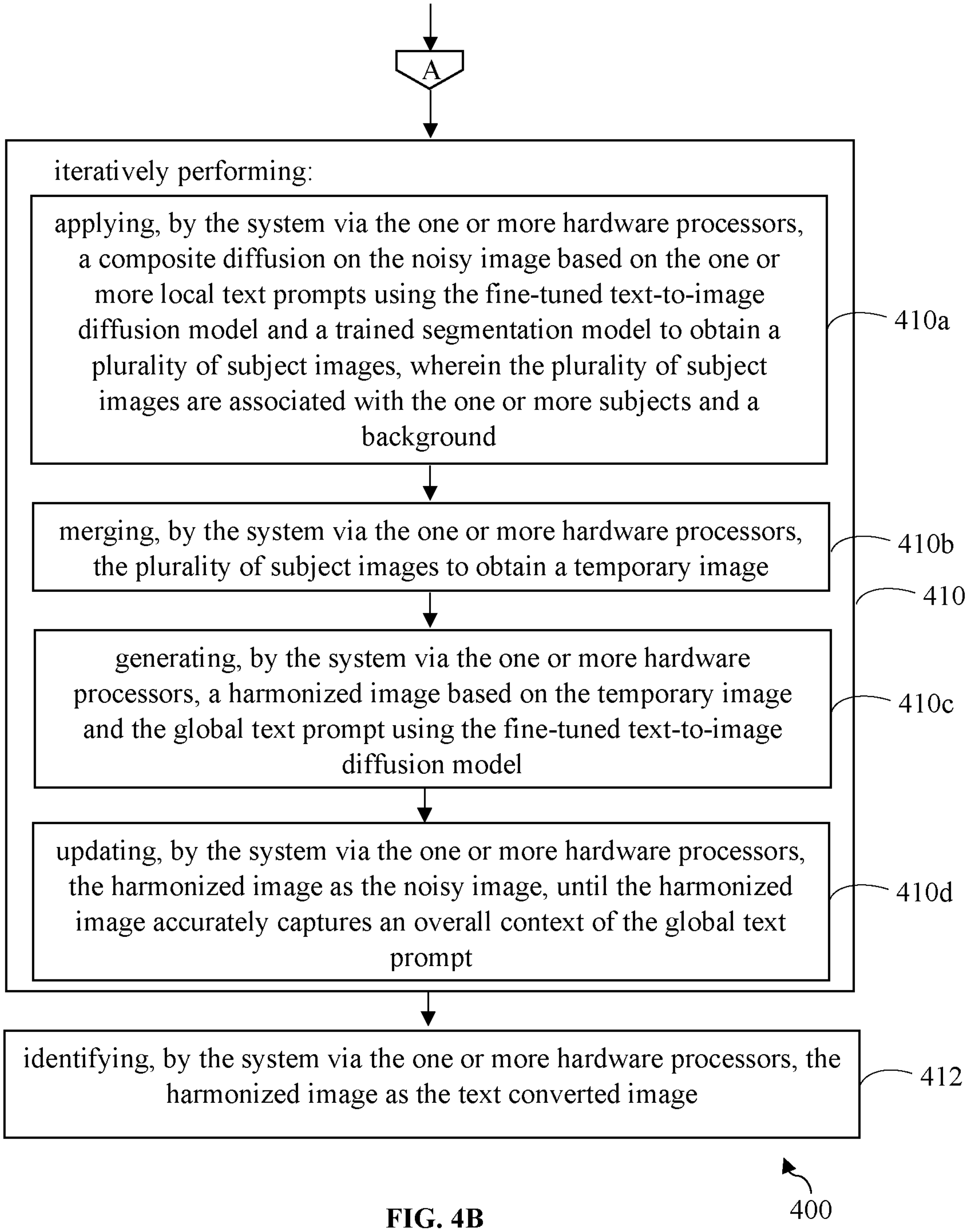

FIGS. 4A and 4B, collectively, with reference to FIGS. 1 to 3, represent an exemplary flow diagram of a method 400 for personalized multi-subject text to image generation, in accordance with an embodiment of the present disclosure. The method 400 may use the system 102 of FIGS. 1 and 2 for execution. In an embodiment, the system 102 comprises one or more data storage devices or the memory 208 operatively coupled to the one or more hardware processors 206 and is configured to store instructions for execution of steps of the method 400 by the one or more hardware processors 206. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 102 as depicted in FIG. 2 and FIG. 1.

At step 402 of the present disclosure, the one or more hardware processors 206 of the system 102 receive a plurality of inputs associated with text-to-image generation from a user device. The plurality of inputs comprises a) a plurality of personalized images of each subject of one or more subjects that a user wants to be present in a text converted image, b) one or more local text prompts, c) a global text prompt, and d) a subject segment image. The plurality of personalized images present each subject from different angles and positions. The subject segment image is a colorful map showing desired subject placement of each subject of the one or more subjects in the text converted image to be generated with a color label. Each local text prompt of the one or more local text prompts is associated with a subject of the one or more subjects. In particular, each local prompt is a text prompt describing characteristics of a subject. The global text prompt is associated with the text converted image to be generated. In particular, the global text prompt is for entire scene describing global context for the text converted image.

At step 404 of the present disclosure, the one or more hardware processors 206 of the system 102 assign a unique identifier and a class name to each subject of the one or more subjects.

At step 406 of the present disclosure, the one or more hardware processors 206 of the system 102 fine-tune a text-to-image diffusion model based, at least in part, on the plurality of personalized images, the unique identifier and the class name of each subject to obtain a fine-tuned text-to-image diffusion model. The above step can be better understood by way of the following description.

As mentioned at step 404, each subject is assigned a unique identifier and a class name. So, if an object is a cartoon character called 'sks', then the system assigns 'sks' as the unique identifier for the cartoon character. Then, the system 102 uses the plurality of personalized images that are present for each subject from different angles and positions to fine-tune the text-to-image diffusion model so that the text-to-image diffusion model understand better about each subject's appearance, and thus can create more accurate images. However, the text-to-image diffusion model may require two sets of images for personalization of a subject. One is the subject itself and the other is a class to which the subject belongs. So, as per the previous example of cartoon character 'sks', the 'sks' is the identifier and the 'cartoon character' is the class to which it belongs.

Thus, the system 102 fine-tunes the text-to-image diffusion model using the plurality of personalized images, the unique identifier and the class name of each subject to obtain fine-tuned text-to-image diffusion model.

In an embodiment, to make the text-to-image diffusion model even better by solving the issue of language drift and overfitting, the class images are customized and then used for fine-tuning. In particular, the text-to-image diffusion model i.e., the Dreambooth model is fine-tuned to create images based on text descriptions so that it works really well for lots of different subjects by giving them unique identifiers and showing the model lots of example pictures. In an exemplary scenario, assume user want to generate images with 4 characters, then the user may provide 9-12 sample pictures of each subject for fine-tuning of the text-to-image diffusion model.

At step 408 of the present disclosure, the one or more hardware processors 206 of the system 102 create a noisy image. The noisy image is a normal distribution with mean '0' and variance '1'.

At step 410 of the present disclosure, the one or more hardware processors 206 of the system 102 converts the noisy image into a harmonized image by iteratively performing a plurality of steps 410*a* through 410*d* until the harmonized image accurately captures an overall context of the global text prompt.

More specifically, at step 410*a* of the present disclosure, the one or more hardware processors 204 of the system 102 apply a composite diffusion on the noisy image based on the one or more local text prompts using the fine-tuned text-to-image diffusion model and a trained segmentation model to obtain a plurality of subject images. The plurality of subject images are associated with the one or more subjects and a background. The above step can be better understood by way of the following description.

The system 102 has inputs such as 1) the subject segment image explaining the position of each subject with color labels, 2) one or more local text prompts i.e., the captions defining what the individual subject is doing in the picture, and 3) the global text prompt i.e., a caption for defining the complete image to be generated. An example representation of the inputs required for performing composite diffusion is shown with reference to FIG. 5.

Figure 5:
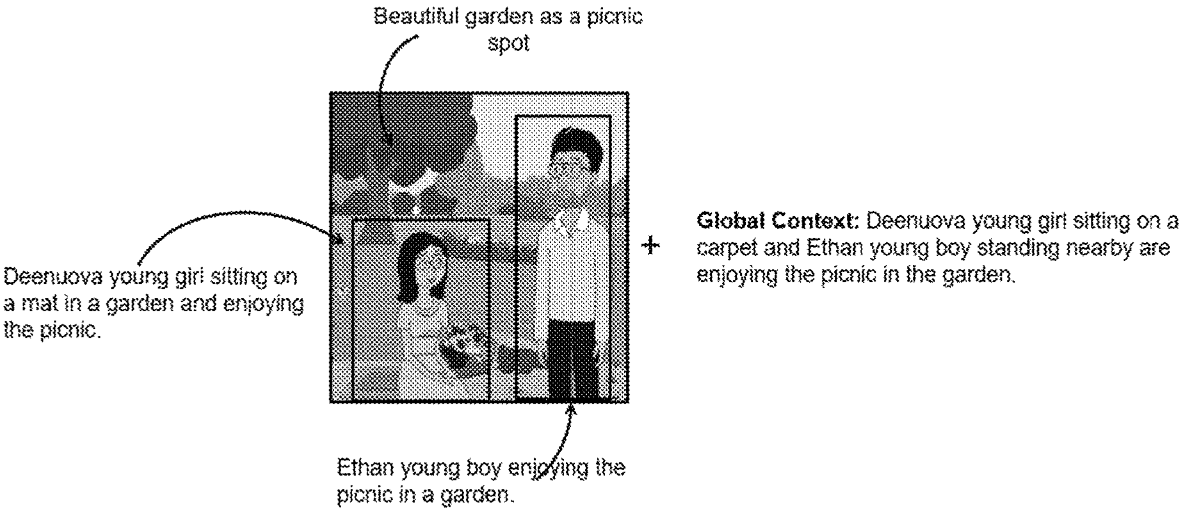
FIG. 5 illustrates an exemplary representation of inputs required for performing a composite diffusion, in accordance with an embodiment of the present disclosure.
Figure 6:
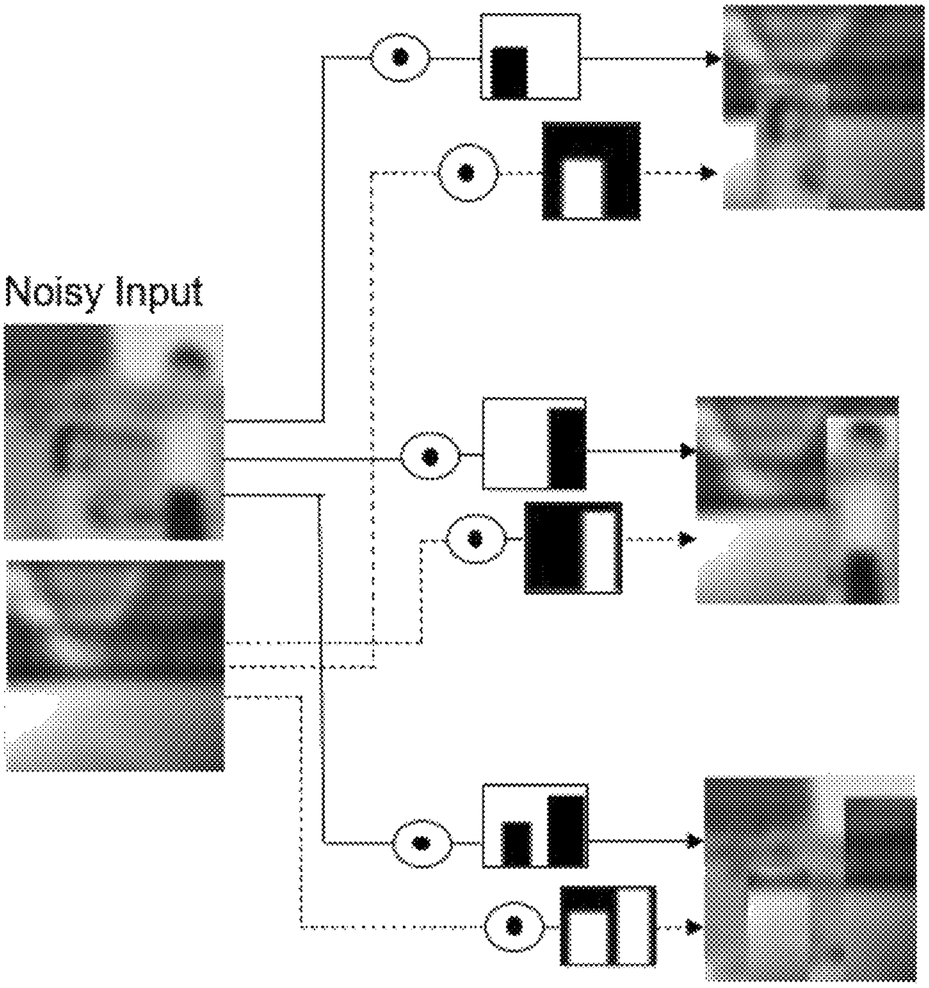
FIG. 6 illustrates an exemplary representation of a process followed by the system of FIG. 2 for creating subject images, in accordance with an embodiment of the present disclosure.
Figure 7:
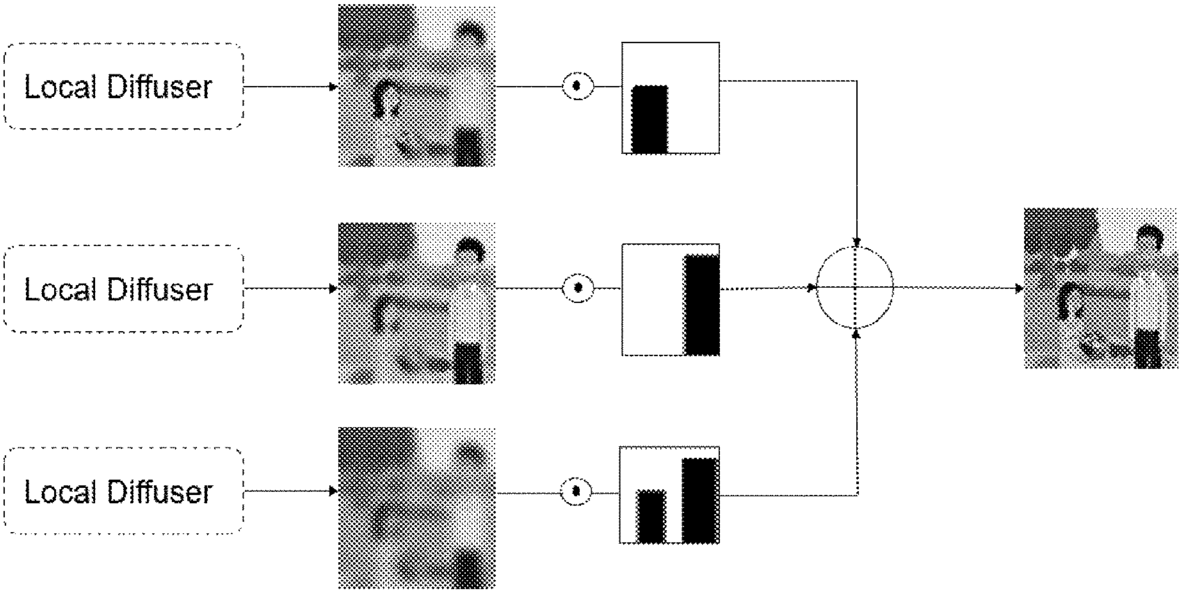
FIG. 7 illustrates an exemplary representation of a process followed by the system of FIG. 2 for creating harmonized image, in accordance with an embodiment of the present disclosure.

As seen in FIG. 5, the subject segment image explains the position of two subjects namely 'Deenouva' a young girl sitting on a mat in a garden and enjoying picnic with one color and 'Ethan' a young boy enjoying the picnic in the garden with another colour. A white region in the subject segment image represents the background i.e., a beautiful garden as a picnic spot. So, the system 102, as part of the composite diffusion, first creates a local image for each subject based on the color label of a corresponding subject, and the local image for the background based on the subject segment image. The color label of each subject is accessed from the subject segment image, and the local image for the background is created based on the white region present in the subject segment image.

Then, the system 102 creates a complementary image for each subject and the background based on the local image of the corresponding subject and the background, respectively. In particular, the complementary image for each subject is created by taking everything except the subject in the local image created for the corresponding subject.

Thereafter, the system 102 creates a subject image for each subject based, at least in part, on the local image of the corresponding subject, the complementary image of the corresponding subject and a local text prompt associated with the corresponding subject, and a subject image for background based on the local image and the complementary image of the background using the fine-tuned text-to-image diffusion model.

In particular, the system 102 uses the fine-tuned text-to-image diffusion model (also referred as local diffusers) to create the subject image for each subject based on the local text prompt that is received for the corresponding subject and the local and complementary image that is created for the corresponding subject. In an embodiment, the fine-tuned text-to-image diffusion model uses the trained segmentation model to correct subject appearance in the corresponding subject image to obtain a corrected subject image. Basically, the trained segmentation model computes a subject aware segmentation loss which is basically a probability of the input image with the trained subjects at pixel level. The subject aware segmentation loss helps the fine-tuned text-to-image diffusion model to focus om the subject appearance i.e., correct the subject appearance in the subject image to obtain the corrected subject image.

With respect to the previous example, the system 102 creates one subject image for Deenouva, another subject image for Ethan and yet another subject image for background i.e., the picnic spot. An exemplary representation of the process followed by the system 102 for creating subject images is shown with reference to FIG. 6.

At step 410*b* of the present disclosure, the one or more hardware processors 206 of the system 102 merge the plurality of subject images to obtain a temporary image. In particular, the plurality of corrected subject images are merged to obtain the temporary image. The temporary image generated at this step may suffer from weak interaction among subjects.

At step 410*c* of the present disclosure, the one or more hardware processors 206 of the system 102 generate a harmonized image based on the temporary image and the global text prompt using the fine-tuned text-to-image diffusion model. In particular, the fine-tuned text-to-image diffusion model (also referred as a global diffuser) takes the temporary image and the global text prompt as input to perform text-to-image generation and thus provides the harmonized image as output.

At step 410*d* of the present disclosure, the one or more hardware processors 206 of the system 102 update the harmonized image as the noisy image. Once the harmonized image is available, the system 102 uses the harmonized image as input for a next diffusion step as the harmonized image obtained at this step may still not be that clear and may include some noise. So, to remove the noise completely in the harmonized image, the system keep un performing the steps 410*a* to 410*d* until the harmonized image accurately captures an overall context of the global text prompt. This iterative process performed by the system 102 ensures that the model is creating the image in which everything is in correct spot and the problems like missing subjects or mixing of appearance of subjects is not present in the generated image while ensuring right number of subjects are present in the image.

At step 412 of the present disclosure, the one or more hardware processors 206 of the system 102 identify the harmonized image as the text converted image. An exemplary representation of the process followed by the system 102 for creating harmonized image is shown with reference to FIG. 7.

In an embodiment, the steps 410*a* to 410*d* are performed for 't' times, where the 't' is a predefined number that is selected by domain experts.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, existing text-to-object generation models struggle to generate complex compositions with more than two customized subject. So, to overcome the disadvantages, embodiments of the present disclosure provide a method and a system for personalized multi-subject text to image generation. More specifically, the system and the method uses the composite diffusion technique in which local diffusers and a trained segmentation model is used to generate images, thereby ensuring correct subject placement in the generated images. Then, the system computes subject aware segmentation loss to correct the subject appearance in the generated images, which further ensures precise subject appearance in the generated image i.e., the characters in the generated image looks more like original subjects. Further, the system uses a global diffuser to generate the harmonized image, thus ensuring right number of subjects are present in the harmonized image while reducing the overall time taken to generate the harmonized image.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, by a system via one or more hardware processors, a plurality of inputs associated with text-to-image generation from a user device, wherein the plurality of inputs comprises a) a plurality of personalized images of each subject of one or more subjects that a user wants to be present in a text converted image, b) one or more local text prompts, c) a global text prompt, and d) a subject segment image, wherein the plurality of personalized images present each subject from different angles and positions, wherein the subject segment image is a colorful map showing desired subject placement of each subject of the one or more subjects in the text converted image to be generated with a color label, wherein each local text prompt of the one or more local text prompts is associated with a subject of the one or more subjects, and wherein the global text prompt is associated with the text converted image to be generated;

assigning, by the system via the one or more hardware processors, a unique identifier and a class name to each subject of the one or more subjects;

fine-tuning, by the system via the one or more hardware processors, a text-to-image diffusion model based, at least in part, on the plurality of personalized images, the unique identifier and the class name of each subject to obtain a fine-tuned text-to-image diffusion model;

creating, by the system via the one or more hardware processors, a noisy image, wherein the noisy image is a normal distribution;

iteratively performing:

applying, by the system via the one or more hardware processors, a composite diffusion on the noisy image based on the one or more local text prompts using the fine-tuned text-to-image diffusion model and a trained segmentation model to obtain a plurality of subject images, wherein the plurality of subject images are associated with the one or more subjects and a background, wherein applying the composite diffusion comprises:

creating a local image for each subject based on the color label of a corresponding subject, and the local image for the background based on the subject segment image, wherein the color label of each subject is accessed from the subject segment image, and wherein the local image for the background is created based on a white region present in the subject segment image;

creating a complementary image for each subject and the background based on the local image of the corresponding subject and the background, respectively; and creating a subject image for each subject based, at least in part, on the local image and the complementary image of the corresponding subject and a local text prompt associated with the corresponding subject, and a subject image for background based on the local image and the complementary image of the background using the fine-tuned text-to-image diffusion model;

merging, by the system via the one or more hardware processors, the plurality of subject images to obtain a temporary image;

generating, by the system via the one or more hardware processors, a harmonized image based on the temporary image and the global text prompt using the fine-tuned text-to-image diffusion model; and updating, by the system via the one or more hardware processors, the harmonized image as the noisy image, until the harmonized image accurately captures an overall context of the global text prompt; and identifying, by the system via the one or more hardware processors, the harmonized image as the text converted image.

2. The processor implemented method of claim 1, further comprising:

displaying, by the system via the one or more hardware processors, the text converted image on the user device.

3. The processor implemented method of claim 1, wherein the fine-tuned text-to-image diffusion model creates the subject image for each subject by:

using, by the system via the one or more hardware processors, the trained segmentation model to correct subject appearance in the corresponding subject image to obtain a corrected subject image, wherein the trained segmentation model computes subject aware segmentation loss which helps the fine-tuned text-to-image diffusion model to correct the subject appearance in the subject image to obtain the corrected subject image.

4. The processor implemented method of claim 3, wherein the step of merging, by the system via the one or more hardware processors, the plurality of subject images to obtain the temporary image comprises:

merging, by the system via the one or more hardware processors, a plurality of corrected subject images to obtain the temporary image.

5. The processor implemented method of claim 1, wherein the text-to-image diffusion model is a Dreambooth model.

6. A system, comprising:

a memory storing instructions;

one or more communication interfaces; and one or more hardware processors coupled to the memory via the one or more communication interfaces, wherein the one or more hardware processors are configured by the instructions to:

receive a plurality of inputs associated with text-to-image generation from a user device, wherein the plurality of inputs comprises a) a plurality of personalized images of each subject of one or more subjects that a user wants to be present in a text converted image, b) one or more local text prompts, c) a global text prompt, and d) a subject segment image, wherein the plurality of personalized images present each subject from different angles and positions, wherein the subject segment image is a colorful map showing desired subject placement of each subject of the one or more subjects in the image to be generated with a color label, wherein each local text prompt of the one or more local text prompts is associated with a subject of the one or more subjects, and wherein the global text prompt is associated with the text converted image to be generated;

assign a unique identifier and a class name to each subject of the one or more subjects;

fine-tune a text-to-image diffusion model based, at least in part, on the plurality of personalized images, the unique identifier and the class name of each subject to obtain a fine-tuned text-to-image diffusion model;

create a noisy image, wherein the noisy image is a normal distribution;

iteratively perform:

apply composite diffusion on the noisy image based on the one or more local text prompts using the fine-tuned text-to-image diffusion model and a trained segmentation model to obtain a plurality of subject images, wherein the plurality of subject images are associated with the one or more subjects and a background, wherein applying the composite diffusion on the noisy image are configured by the instructions to:

create a local image for each subject based on the color label of a corresponding subject, and the local image for the background based on the subject segment image, wherein the color label of each subject is accessed from the subject segment image, and wherein the local image for the background is created based on a white region present in the subject segment image;

create a complementary image for each subject and the background based on the local image of the corresponding subject and the background, respectively; and create a subject image for each subject based, at least in part, on the local image and the complementary image of the corresponding subject, a local text prompt associated with the corresponding subject, and a subject image for background based on the local image and the complementary image of the background using the fine-tuned text-to-image diffusion model;

merge the plurality of subject images to obtain a temporary image;

generate a harmonized image based on the temporary image and the global text prompt using the fine-tuned text-to-image diffusion model; and update the harmonized image as the noisy image, until the harmonized image accurately captures an overall context of the global text prompt; and identify the harmonized image as the text converted image.

7. The system of claim 6, wherein the one or more hardware processors are configured by the instructions to: display the text converted image on the user device.

8. The system of claim 6, wherein for creating the subject image for each subject using fine-tuned text-to-image diffusion model, the one or more hardware processors are configured by the instructions to:

using the trained segmentation model to correct subject appearance in the corresponding subject image to obtain a corrected subject image, wherein the trained segmentation model computes subject aware segmentation loss which helps the fine-tuned text-to-image diffusion model to correct the subject appearance in the subject image to obtain the corrected subject image.

9. The system of claim 8, wherein for merging the plurality of subject images to obtain the temporary image, the one or more hardware processors are configured by the instructions to:

merge a plurality of corrected subject images to obtain the temporary image.

10. The system of claim 6, wherein the text-to-image diffusion model is a Dreambooth model.

11. One or more non-transitory machine-readable information storage mediums comprising one or more instructions which when executed by one or more hardware processors cause:

receiving, by a system, a plurality of inputs associated with text-to-image generation from a user device, wherein the plurality of inputs comprises a) a plurality of personalized images of each subject of one or more subjects that a user wants to be present in a text converted image, b) one or more local text prompts, c) a global text prompt, and d) a subject segment image, wherein the plurality of personalized images present each subject from different angles and positions, wherein the subject segment image is a colorful map showing desired subject placement of each subject of the one or more subjects in the text converted image to be generated with a color label, wherein each local text prompt of the one or more local text prompts is associated with a subject of the one or more subjects, and wherein the global text prompt is associated with the text converted image to be generated;

assigning, by the system, a unique identifier and a class name to each subject of the one or more subjects;

fine-tuning, by the system, a text-to-image diffusion model based, at least in part, on the plurality of personalized images, the unique identifier and the class name of each subject to obtain a fine-tuned text-to-image diffusion model;

creating, by the system, a noisy image, wherein the noisy image is a normal distribution;

iteratively performing:

applying, by the system, a composite diffusion on the noisy image based on the one or more local text prompts using the fine-tuned text-to-image diffusion model and a trained segmentation model to obtain a plurality of subject images, wherein the plurality of subject images are associated with the one or more subjects and a background, wherein applying the composite diffusion comprises:

creating a local image for each subject based on the color label of a corresponding subject, and the local image for the background based on the subject segment image, wherein the color label of each subject is accessed from the subject segment image, and wherein the local image for the background is created based on a white region present in the subject segment image;

creating a complementary image for each subject and the background based on the local image of the corresponding subject and the background, respectively; and creating a subject image for each subject based, at least in part, on the local image and the complementary image of the corresponding subject and a local text prompt associated with the corresponding subject, and a subject image for background based on the local image and the complementary image of the background using the fine-tuned text-to-image diffusion model;

merging, by the system, the plurality of subject images to obtain a temporary image;

generating, by the system, a harmonized image based on the temporary image and the global text prompt using the fine-tuned text-to-image diffusion model; and updating, by the system, the harmonized image as the noisy image, until the harmonized image accurately captures an overall context of the global text prompt; and identifying, by the system, the harmonized image as the text converted image.

12. The one or more non-transitory machine-readable information storage mediums of claim 11, wherein the one or more instructions which when executed by the one or more hardware processors further cause:

displaying, by the system, the text converted image on the user device.

13. The one or more non-transitory machine-readable information storage mediums of claim 11, wherein the fine-tuned text-to-image diffusion model creates the subject image for each subject by:

using, by the system, the trained segmentation model to correct subject appearance in the corresponding subject image to obtain a corrected subject image, wherein the trained segmentation model computes subject aware segmentation loss which helps the fine-tuned text-to-image diffusion model to correct the subject appearance in the subject image to obtain the corrected subject image.

14. The one or more non-transitory machine-readable information storage mediums of claim 13, wherein the step of merging, by the system, the plurality of subject images to obtain the temporary image comprises:

merging, by the system, a plurality of corrected subject images to obtain the temporary image.

15. The one or more non-transitory machine-readable information storage mediums of claim 11, wherein the text-to-image diffusion model is a Dreambooth model.

* * * * *